(12) United States Patent
Sunshine et al.

(10) Patent No.: US 7,593,863 B1
(45) Date of Patent: Sep. 22, 2009

(54) SYSTEM FOR MEASURING AND TESTING A PRODUCT USING ARTIFICIAL OLFACTOMETRY AND ANALYTICAL DATA

(75) Inventors: Steven A. Sunshine, Pasadena, CA (US); Erik J. Severin, Hayward, CA (US)

(73) Assignee: Smiths Detection Inc., Pasadena, CA (US)

( * ) Notice: Subject to any disclaimer, the term of this patent is extended or adjusted under 35 U.S.C. 154(b) by 1444 days.

(21) Appl. No.: 09/802,354

(22) Filed: Mar. 9, 2001

Related U.S. Application Data

(60) Provisional application No. 60/188,582, filed on Mar. 10, 2000, provisional application No. 60/188,594, filed on Mar. 10, 2000, provisional application No. 60/188,595, filed on Mar. 10, 2000, provisional application No. 60/188,634, filed on Mar. 10, 2000.

(51) Int. Cl.
*G06Q 30/00* (2006.01)
(52) U.S. Cl. ...................................................... 705/15
(58) Field of Classification Search .................. 705/26, 705/27; 706/45, 46, 47, 52, 54, 900, 925, 706/934; 707/1–6, 100, 102
See application file for complete search history.

(56) References Cited

U.S. PATENT DOCUMENTS

| | | | | |
|---|---|---|---|---|
| 4,870,579 A | * | 9/1989 | Hey | 705/27 |
| 5,749,081 A | * | 5/1998 | Whiteis | 707/102 |
| 5,832,494 A | * | 11/1998 | Egger et al. | 707/102 |
| 5,897,627 A | * | 4/1999 | Leivian et al. | 706/12 |
| 6,026,397 A | * | 2/2000 | Sheppard | 707/5 |
| 6,049,797 A | * | 4/2000 | Guha et al. | 707/6 |
| 6,085,576 A | * | 7/2000 | Sunshine et al. | 73/29.01 |
| 6,370,513 B1 | * | 4/2002 | Kolawa et al. | 705/10 |
| 6,523,026 B1 | * | 2/2003 | Gillis | 707/3 |
| 6,646,659 B1 | * | 11/2003 | Brown et al. | 345/811 |

OTHER PUBLICATIONS

Davison, Mark L.; *Multidimensional Scaling*; Wiley series in Probability and Mathematical Statistics; 1983; Chap. 1, New York, NY.
Kruskal, J.B. and Wish, M.; *Multidimensional Scaling*; Sage University Paper; 1978; Beverly Hills, CA.
McEwan, J.A.; *Cluster Analysis and Preference Mapping*; Campden & Chorleywood Food Research Assoc.; 1998; Review No. 12; Gloucestershire, UK.
McEwan, J.A., Earthy, P.J., Ducher, C.; *Preference Mapping: A Review*; Campden & Chorleywood Food Research Assoc., 1998; Review No. 6; Gloucestershire, UK.
McEwan, J.A. and Ducher, C.; *Preference Mapping Case Studies*; Campden & Chorleywood Food Research Assoc.; 1998, Review No. 7; Gloucestershire, UK.

* cited by examiner

*Primary Examiner*—Andrew Joseph Rudy
(74) *Attorney, Agent, or Firm*—Foley & Lardner LLP

(57) ABSTRACT

The present invention relates to systems and methods for measuring and testing a product using artificial olfactometry and analytical data sensory to identify preferences. The system accurately facilitates a consumer's choice between products using descriptors of similar yet different products. The system and methods provide an objective recommendation based upon analytical descriptors and attributes of particular products. The system eliminates the subjective recommendations of persons familiar with many comparable and related products and thereby makes objective recommendations between products.

9 Claims, 11 Drawing Sheets

SYSTEM FOR MEASURING AND TESTING A PRODUCT USING ARTIFICIAL OLFACTOMETRY AND ANALYTICAL DATA

CROSS-REFERENCE TO RELATED APPLICATIONS

The present invention claims priority to U.S. Provisional Application Nos. 60/188,582, 60/188,594, 60/188,595 and 60/188,634, all filed on Mar. 10, 2000, the disclosures of which are hereby incorporated by reference in their entirety for all purposes.

FIELD OF THE INVENTION

This invention generally relates to techniques for measuring and identifying preferences. More particularly, the present invention provides systems and methods for using multidimensional information that measures and characterizes substances by similarity.

BACKGROUND OF THE INVENTION

Consumers spend a lot of time choosing among different name brand products. After enjoying a bottle of wine for example, it is sometimes desirable to select another similar tasting bottle of wine to enjoy. The decision process oftentimes involves relying on subjective recommendation of others, trade magazines, tasting panels, wine newsletters, and the like. These sources are by their very nature subjective, however they often mitigate the possibility of the second bottle not being as enjoyable. Alternatively, consumers could rely on their own senses, such as sight, taste and smell. This alternative route generally requires the user to make an additional purchase. Typically, the purchase could be in a retail environment or over the Internet.

Human tasting panels have been used in the food and beverage industry for decades and represent one subjective system to evaluate products. Generally, there are different types of testing panels: 1) a technical panel, which uses highly trained members skilled in tasting systems such as descriptive analysis; 2) a general panel which uses untrained but experienced members in for example, a triangle technique (described below), and 3) a consumer panel that uses consumer testing organizations or an average consumer.

Various types of methods exist for sensory evaluations by taste panels. For instance, the discrimination method determines how products are perceived and determines the significance of their differences. There are at least four different discrimination methods. The most common discrimination method is the triangle test. In the triangle test, panelists receive three coded samples. The members are told that two of the samples are the same and that one sample is different. Panelists are asked to identify the odd sample, or which two samples are similar. This discriminatory testing method is often used as a tool in quality assurance programs. Triangle tests are also used in product development studies to determine if various ingredient substitutions or changes in processes will result in adverse product effects.

Another system is the duo-trio test. In this test, three samples are presented. One sample is labeled as the reference and the other two are coded. One of the coded samples is identical to the reference and the other coded sample is different. Panelists are then asked to identify the coded reference sample. Both the triangle and the duo-trio methods can be used to screen panelists for their ability to reputably select a specific trait when tasting products e.g., beverages for flavor.

Yet another testing method is the paired-comparison test. In this method, a pair of coded samples is presented for comparison on the basis of some specified characteristic such as saltiness, sweetness, etc. The panelist must often determine samples having the specified descriptors. This method is similar to the triangle tests, however fewer samples are required and there is less tasting.

Still further, another method is the ranking test. The ranking test is an extension of the paired-comparison test. Panelists receive three or more coded samples and are asked to rank samples for intensity of some specific characteristic. Ranking tests are often used to screen one or two "best samples" from a group of samples rather than to thoroughly test all samples.

In addition to the aforementioned discrimination methods, descriptive methods determine qualitative and quantitative traits of a sample such as a beverage, by use of a small-trained panel (about 5 to 100 members). Techniques such as a flavor profile, a textural profile and quantitative descriptive analysis (QDA) are used. Descriptive analysis may require at least three evaluative processes. First, discrimination of the trait; second, description of the trait; and third, quantifying the trait. The steps of discrimination and description of traits are qualitative. Moreover, the language used in the analysis is developed through careful training and practice with the panel. This requires panelists to develop a common vocabulary that catalogues various sensory stimuli with appropriate language. Thus, descriptive analysis is a complex cognitive process that requires more mental acuity than sharp taste or olfactory senses.

Discrimination among stimuli is only part of the qualitative process. The third step in descriptive analysis is to quantify the traits. Two products may be quite similar in their qualitative components, but differ overall because of the relative intensities of these descriptors. Descriptive analysis is one sensory method that deals with the total picture or profile of a beverage product.

In addition to the above methods, many types of scales or scoring methods e.g., hedonic scale, are used for preference evaluations. These scoring methods include structured scales or graphics. In structured scales, a scale having at least 7 to 10 points is recommended because panelists tend to avoid using the end points on the scale. To use less than a 7-point scale may not allow the panelists to show the degree of variation observed.

In view of the foregoing, what is needed in the art are systems and methods to correlate human preference of a consumer product with the physical attributes or descriptors of the product itself. In addition, systems are needed that eliminate the need for human expert sensory panels. The present invention fulfills these and other needs.

SUMMARY OF THE INVENTION

In certain aspects, the present invention provides systems, methods and computer code products for sensory matchmaking. The systems and methods accurately facilitate a consumer's choice between products using descriptors of similar yet different products. The system and methods provide an objective recommendation based upon descriptors and attributes of particular products. Moreover, the system eliminates the subjective recommendations of persons familiar with many comparable and related products and thereby makes objective recommendations between products. As the present system is based on scientific measurable attributes of the particular product, it greatly improves upon previously known systems and methods. More particularly, the present invention provides systems and methods for selecting consumer products of interest from a plurality of products and suggesting the selected products to the consumer.

In other embodiments, the present invention provides systems and methods of recommending consumer products using a recommendation engine. Preferably, the recommendations are based upon comparisons of chemical and physical analytical descriptors of the consumer product, as well as human preferences. Preferably, the recommendation engine comprises a proximity engine and a preference engine. The systems and methods of the invention are preferably implemented over a network, preferably the Internet.

In one embodiment, the present invention provides a system for recommending a consumer product across a network. The system includes a recommendation engine comprising a first module for determining a difference between a plurality of consumer products having a plurality of descriptors by differentiating between at least one descriptor of each of the plurality of consumer products and thereafter, providing the difference to a computer module. The system includes a second module coupled to the recommendation engine for sorting between each of the consumer products to form classes or groups, preferably at least two classes, for the plurality of consumer products. In addition, the system includes a third module that is coupled to the recommendation engine. The third module determines for each of the plurality of consumer products, a correlation between the classes and each of the plurality of descriptors. The third module also assigns a weighting term for each of the plurality of descriptors based upon each of the descriptor's ability to sort between the classes. A fourth module coupled to the recommendation engine provides a recommendation based upon weighting terms.

In another embodiment, the present invention provides systems and methods for recommending consumer products using a recommendation engine. Preferably, the recommendations are based upon intrinsic and extrinsic descriptors of the consumer product. In this embodiment, sorting by a human sensory panel is not necessarily required.

Numerous benefits are achieved by way of the present invention over conventional techniques. For example, the present invention combines subjective and objective criteria for selecting; for example, a cosmetic, a perfume or a wine, based upon human preferences or perceived similarities. Using the systems of the present invention, data from human sensory panels and analytical descriptor data can be correlated. Moreover, the descriptors that are the most important in determining sensory similarity are determined. Various additional objects, features and advantages of the present invention can be more fully appreciated with reference to the detailed description and accompanying drawings that follow.

DETAILED DESCRIPTION OF THE INVENTION AND PREFERRED EMBODIMENTS

A wide variety of consumer products can be used in the systems and methods of the present invention. Suitable consumer products include, but are not limited to, cosmetics, tobacco, perfume, cologne, liquor, liqueurs and consumable liquids. Consumable liquids include, but are not limited to, wine, sake, liquor, cognac, whiskey, bourbon, scotch, brandy, liqueurs, vodka, gin, rum, sherry, port, coffee, tea, cocoa, soda, juice and mint. Moreover, the systems of the present invention are applicable to malt beverages, fermented cereal beverages and especially distilled beverages. Examples of fermented cereal beverages include, but not limited to, all malt, mixtures of rye and malt, mixtures of corn, rye and malt, mixtures of rye, wheat and malt, corn, and rice. These are employed in known manner in the production of the corresponding beverages: scotch, rye, bourbon, Irish whiskey, grain alcohol and Arrak, respectively. Those of skill in the art will recognize other suitable consumer products suitable for use in the present invention.

Figure 1:
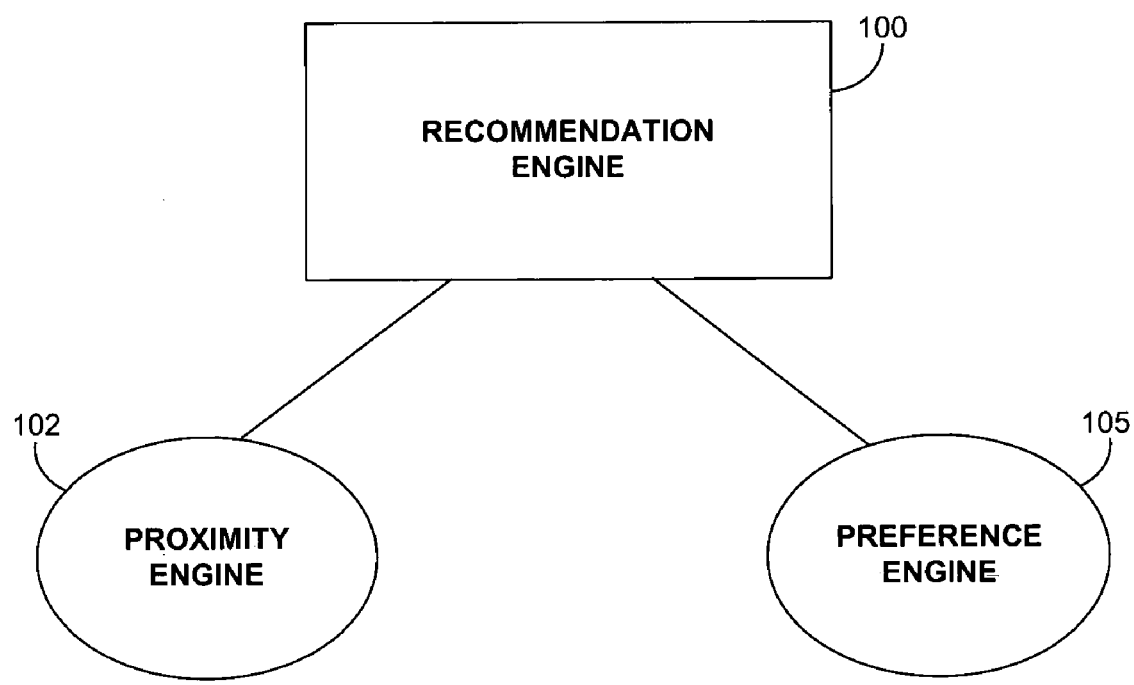
FIG. 1 illustrates a representative recommendation engine of the present invention.

FIG. 1 is a schematic of a recommendation engine 100 of the present invention. This diagram is merely an illustration and should not limit the scope of the claims herein. One of ordinary skill in the art will recognize other variations, modifications, and alternatives. As illustrated therein, the recommendation engine preferably comprises a proximity engine 102. In other embodiments, the recommendation engine further comprises a preference engine 105. As used herein, the term "engine" refers to custom code embedded in various hardware devices including, but not limited to, a processor, a microprocessor, a DSP processor, a specially designed ASIC, or other circuits designed to performed the analysis functions described herein. The engine can also be a general-purpose processor executing program codes written to perform the required functions.

Figure 2:
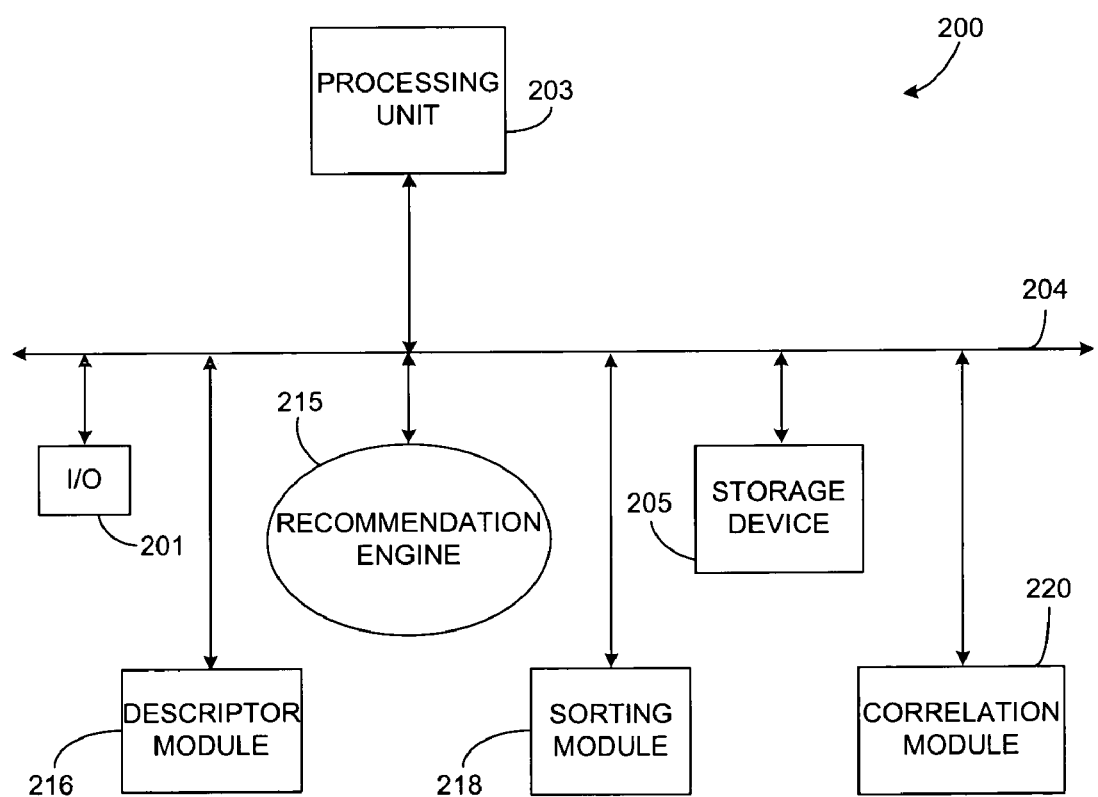
FIG. 2 illustrates a representative system for embodying the present invention.

FIG. 2 illustrates a schematic of a system 200 of the present invention. This schematic is merely an example that should not limit the scope of the claims herein. One of ordinary skill in the art will recognize many other variations, alternatives, and modifications. The recommendation engine 215 provides one or more communication channels via system bus 204 interconnected with a plurality of components such as storage device 205, the main processing unit 203 and input/output (I/O) devices 201. The recommendation engine which can be accessed through a login screen from the client user, provides further communication access to various modules including, but not limited to, descriptor module 216, sorting module 218 and correlation module 220. Other formats, such as SCSI, can be used in various specific embodiments by those of ordinary skill in the art. Network interface is provided for example, by Ethernet, which can provide access to local networks as well as wide area networks. Other arrangements of modules and interconnections are readily achievable by those of ordinary skill in the art.

The consumer products of the present invention are analyzed to generate chemical and physical analytical descriptors. The physical and or chemical analytical descriptors thereafter make up a profile of descriptors (POD). More particularly, the profile of descriptors defines a set of analytical parameters that, when similar for two consumable products, reflect similarity in human perception for that product. Preferably, the descriptors represent similarities in human perception. The descriptor module that is interfaced with the recommendation engine determines a difference between a plurality of consumer products each having a plurality of descriptors. The descriptor module differentiates between at least one descriptor of each the plurality of consumer products. Thereafter, the descriptor module provides the determined difference to the main processing unit. In operation, when two consumer products are close in descriptor-space, the proximity engine assigns a proximity number to them. The more similar the two consumer products are, the closer the proximity numbers are as well. In certain aspects, after the proximity number is assigned, a user employing the systems of the present invention provides the name of a product they prefer. The product or consumer product they prefer is referred to herein as the "template" item. After the template item is provided by the user, the proximity engine provides a list of products that will be perceived (taste, smell, feel) similarly. The consumer product(s) that are perceived similarly are referred to herein as the "matched" list. As explained in detail hereinbelow, the matched list is based on a mapping, such as a cluster mapping distance, between the template item and the matched item(s) that are directly related by their proximity numbers. The present system is preferably implemented over the Internet.

The following illustrative embodiment uses wine as a consumer product. Modifications of the illustrated embodiment as well as other embodiments of the invention will become apparent to those persons skilled in the art upon reference to this description. The profile of descriptors can be both intrinsic descriptors that relate to the consumer product itself, and extrinsic descriptors, which are derivatively related to the consumer product. For example, wine has intrinsic descriptors which include, but are not limited to, pH, color, tannin content, scent, electronic nose signature (ENS), temperature, density, humidity, sugar content, alcohol content, water content, particulate presence and size/type of grape used in the manufacturing process. Extrinsic descriptors of wine include, but are not limited to, vintage, age, appellation, cost, and aging process. As used herein, the term "electronic nose signature" refers to an electronic nose olfaction print for a consumer product. A preferred electronic nose is disclosed in WO 99/47905. Using the systems of the present invention, a list or profile of one or more of the foregoing descriptors is generated for each of the consumer products. Preferably, the profile of descriptors (POD) of the consumer products is capable of being reduced to an electronic format such as a digital format.

In certain instances, a profile of descriptors (POD) is generated for example, by analytically measuring pH, sugar content, tannin content, color intensity, residual grape skin, alcohol content, electronic nose signature, etc. For example, wine color is one important intrinsic descriptor capable of being reduced to an electronic format. Wine colors vary due to the type of grape used, the age of the wine, and the aging process. In general, white wines take on more color as they get older while red wines lose color. Wines aged in wood like oak barrels can also take on more color. In certain aspects, the color of a wine can be measured empirically using a spectrophotometer and thereafter reduced to an electronic format. Those of skill in the art will know of other descriptors suitable for use in a profile of descriptors. Typically, a product's POD will consist of at least one descriptor, but more preferably, about 3 or more descriptors.

In certain aspects, the physical measurements to generate the profile of descriptors can be measured by a variety of conventional laboratory equipment. These include, but are not limited to, pH meters, IR spectrometers, mass spectrometers, spectrophotometers, NMR spectrometers, color intensity measuring instruments, gas chromatography, etc. In one preferred embodiment, a GC/MS trace makes up the profile of descriptors. In certain instances, the sample can be treated prior to analysis, or preconditioned. For instance, the sample can be preconcentrated or some other similar manipulation to remove or concentrate certain chemical components of the sample itself.

In preferred aspects of the present invention, each of the consumer products provides at least one different descriptor when comparing a first consumer product against a second consumer product. This feature allows differentiation among the consumer products.

In certain embodiments, after a wine's POD is generated and stored, a sensory panel, preferably an expert sensory panel, tastes the consumer products to determine similarities between them, such as wine "A" is similar to wine "B". Wine "A" may be similar to "B" in an unpleasant way i.e. "A" may taste as bad as "B". In certain aspects, wine "A" may taste and/or smell similarly to wine "B" because of various human descriptive traits (HDT) that are present.

In certain embodiments, a sorting module is interfaced with the recommendation engine. The sorting module uses human sensory panel data that sorts each of the consumer products using similarity of sense. Similarity of sense can be based on, but not limited to, the HDT(s) of the particular consumer product. The descriptive analysis system begins with the discrimination of the trait in step The discrimination is merely a step to answer whether the trait is present or absent in the consumer product. In other embodiments, the human sensory data is not necessarily required. The sorting can be accomplished using the weighted descriptors as explained further below.

Human descriptive traits which may make wine "A" taste, smell or sense similarly to "B" include, but are not limited to, sweet, bitter, salty, sour, dry, tannic, fruity, nutty, corky, sulfur, vinegar and sweet sherry. The sensory panel sorts the wines on the basis of whether they smell or taste similarly. In certain aspects, the sensory panel describes the trait and then quantifies the trait. Thus, if sweetness is found to be present in the discrimination step, the panel thereafter describes the trait. This sweetness could be for example, a sherry sweetness, bitter sweetness, etc. The taste panel quantifies the sweetness from say 0-20, depending on its trait quantity. A consumer product such as wine can be rated using 5 or more HDTs, typically about 10 to about 50 HDTs. Human descriptive traits may relate to whether a wine "A" is similar to a wine "B", i.e. tastes or smell the same. Preferably, the human sensory panel sorts between each of consumer products into classes on the basis of similarity.

Perfumes also have their own HDT. These HDTs include, but are not limited to, almond, amber, anise, apple, belladonna, cinnamon eucalyptus, ginseng, honeydew, lime, orange juice, orchid, passion flower, pepper peppermint, pipe tobacco, pineapple and ylang-ylang.

In one embodiment, the human sensory panel sorts the consumer products that sense similarly into groups or classes, preferably at least two classes. This sorting can be accomplished using the triangle test. In the triangle test, panelists receive three coded samples. Two of the samples are the same and one sample is different. Panelists are asked to identify the odd sample, or which two samples sense (taste, smell, etc.) similarly. Using this system, the human sensory panel sorts the consumer products into at least two classes, more preferably at least 3 to about 7 classes, and as many as 10-100 different classes. After sorting the consumer products into at least two classes, the systems of the present invention make a correlation between the classes and each of said plurality of descriptors in the POD.

In one embodiment, the system can be implemented as follows. Using the triangle technique, five expert professional wine tasters, 5 samples (samples 1 through 5) of 5 different wines (A-E) for a total of 25 wine sample can be grouped or classified using similarity of taste as their criteria. The professional wine tasters have extensive training and experience in conducting human perception tests. The 5 samples are coded. The panelist can thereafter group or classify the wines using the triangle system as two of the samples are the same and one sample is different. The magnitude of difference or similarity for the odd sample compared to the same sample is tabulated and mapped. Thereafter, the classes of wines and each of said plurality of descriptors in the POD are correlated. The systems of the present invention identify the most important descriptors in the POD that distinguish the wine's particular class.

In another embodiment, the sorting is accomplished using a sorting module of the present invention. The sorting module in communication with the recommendation engine creates a classification file, which defines the separated groups of consumer products. The classification file is based on a small but statistically significant number of consumer products. Thereafter, it is then possible to take a large universe of consumer products to produce a classification list based upon the descriptors themselves, without the need to correlate with the human sensory panels.

The correlation between the grouping and the POD can be accomplished using the correlation module. The correlation module employs techniques such as, but not limited to, multidimensional scaling, cluster maps, preference-mapping techniques and extended internal preference mapping techniques are used. Preferably, multidimensional scaling and cluster maps are used.

Multidimensional scaling (MDS) is a class of techniques that provide a spatial representation of data that can facilitate interpretation and reveal relationships. In general, MDS techniques, or perceptual mapping, are sets of multivariate statistical methods for estimating the parameters in, and assessing the fit of, various spatial distance models for proximity data. (see, Davison, M. L. (1983) *Multidimensional Scaling*, New York, N.Y.: John Wiley and Sons.) The methods estimate the coordinates of a set of products in space of specified dimensionality from data measuring the distances between pairs of products.

These techniques use proximities among any kind of objects, such as products, as input. The basic data in MDS are measures of proximity between pairs of objects, such as consumer products. A proximity measure is an index defined over pairs of objects that quantifies the degree to which the two objects are similar or dissimilar. By using MDS, the larger the perceived similarity between the two products, as shown by their proximity value, the closer the two products appear on the spatial map. A proximity is a number that indicates how similar or how different two products are perceived. The output from multidimensional scaling is a spatial representation, consisting of a geometric configuration of points, as on a distance map. Each point on the map corresponds to one of the perceived objects.

Correlation coefficients and joint probabilities are examples of proximity measures. For example, if $\delta_{ij}$ refer to the proximity measurement on a product pair (i, j), then a proximity measure can be scored so that the highest values of $\delta_{ij}$ corresponds to the product pairs that are most alike. In this manner, $\delta_{ij}$ is a measure of similarity. Conversely, if the proximity measure is scored so that the highest values correspond to stimulus pairs that are least alike, then it is a measure of dissimilarity.

The data for the MDS procedure consists of one or more square symmetric or asymmetric matrices of similarities or dissimilarities between products. The distance model for dissimilarity of products, such as wines, can be stated as follows. If $\delta_{ij}$ refer to the proximity measurement on a product pair (i, j), then the dissimilarity measures are functionally related to K a descriptor from the POD. For instance, if $x_{ik}$ and $x_{jk}$ are the level of attribute k possessed by two product i and j, and the descriptor is pH, then $x_{ik}$ and $x_{jk}$ would represent the pH of the two wines. Using MDS, the dissimilarity measures are related to the descriptor levels by the following function, or Euclidean distance model:

$$\delta_{ij} = d_{ij} = \left[\sum_{K=1}^{K}(x_{ik} - x_{jk})^2\right]^{1/2}$$

In the equation above, $\delta_{ij}$ refers to a quantitative or empirical observation on a product pair (i,j), whereas $\delta_{ij}x_{ik}$ and $x_{jk}$ are theoretical quantities in the statistical model for dissimilarity data. These theoretical quantities cannot be observed, but can be estimated from data. In general, there are two types of MDS, i) metric and ii) non-metric. Metric MDS makes the assumption that the input data is either ratio or interval data, while the non-metric model requires that the data be in the form of ranks. Therefore, the non-metric model has fewer restrictions than the metric model, but also less rigor. One advantage of the non-metric models is the ease of categorization and examination of preference data. The four basic steps in MDS include: 1) data collection and formation of the similarity/dissimilarity matrix; ii) extraction of stimulus coordinates; iii) calculate number of stimulus coordinates that represent the data and iv) rotation and interpretation of preference map. In one embodiment, multidimensional scaling is accomplished using software from the SAS Institute (www.sas.com). In this aspect, the PROC MDS program can be used.

In certain other aspects, cluster maps can be used which are linear or non-linear mapping algorithms to reduce multidimensional pattern space to two or three-dimensional space. The technique results in "clustering" of similar pattern types around two or three-dimensional coordinate and thus are referred to clustered maps.

The correlation module then assigns a weighting term to each of the descriptor in the POD. The weighting term is based upon the descriptor significance in correlate the wine into a particular group or class. For example, if a pH of 7.3-7.8 of a beverage such as wine correlates with a certain class, it is thus possible to select another wine based upon a similar pH knowing that it too will be assigned to the same class. Using the mapping techniques of the present invention, it is possible to recommend products having a similar sense (for example, taste or smell) based upon one or more of the descriptor(s) of the product.

As explained in detail hereinbelow, each of the descriptors in the POD is assigned a weight. It thus possible to classify the consumer products such as wine based upon the weighted descriptors. For instance, a large universe of wines is analytically measure for the significant descriptors. The most significant descriptors are identified using mapping with human data. Thereafter, the consumer products can be grouped using the descriptors alone. It is then possible to make recommendations based upon the descriptors.

Preference mapping is another technique that correlates individual consumer preference ratings to a set of products, such as wine. Using these techniques, individual consumer's preferences for products are represented on a preference map. At least three types of preference mapping techniques exist. An internal preference map resolves a series of consumer preferences into a set of preference dimensions. The preference dimensions represent differences among the products and a set of directions showing the individual consumer's direction of increasing preference. Products such as wine, are positions on the map and those that are close in space have similar acceptability scores, and those wines which are far apart, have different acceptability scores. The goal is to determine if groups of consumers show a preference or inclination for a particular area of the map. The external preference map plots preference scores derived from other sources, such as laboratory sensory panels. An extended internal preference map projects human descriptive traits determined as above i.e., from a trained panel, onto an internal preference map.

Figure 3:
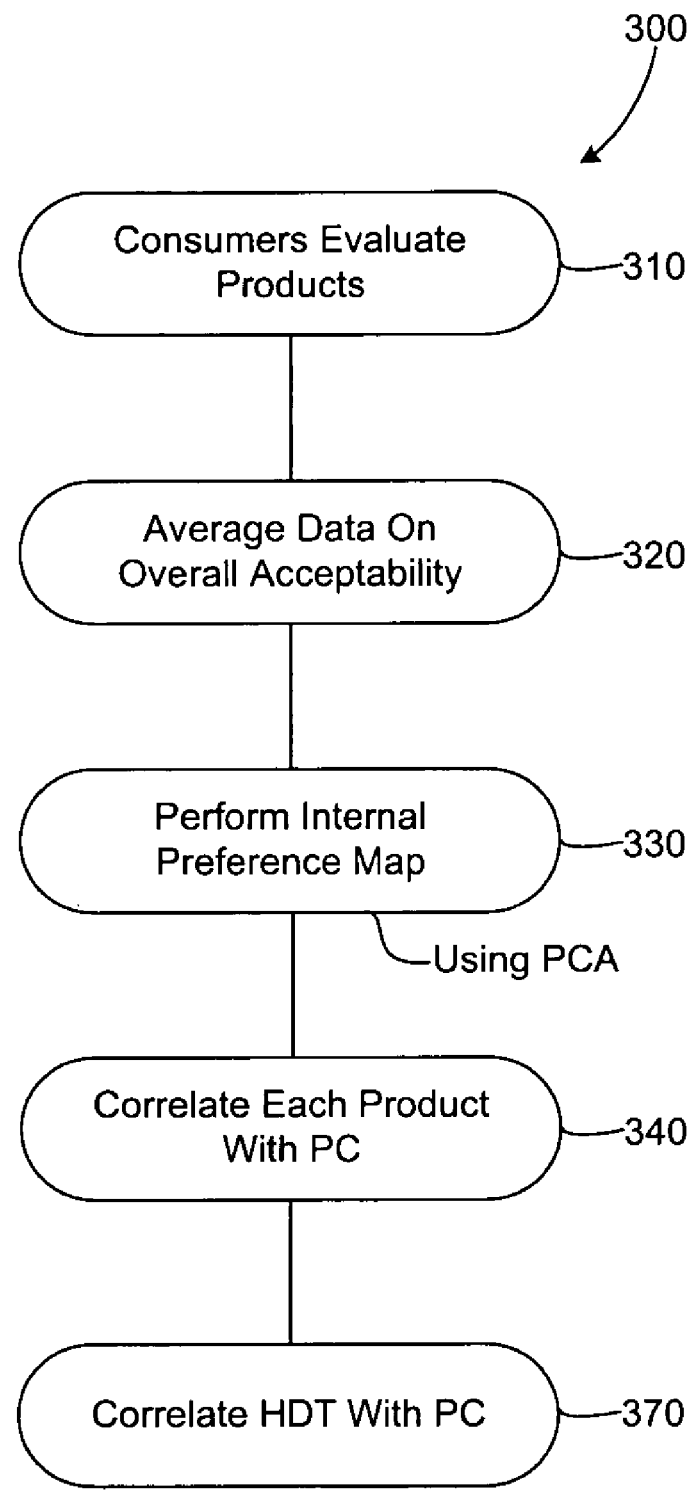
FIG. 3 illustrates a representative extended internal preference technique.

FIG. 3 illustrates a representative extended internal preference technique 300 according to a particular embodiment of the present invention. This flow diagram is merely an illustration and should not limit the scope of the claims herein. One of ordinary skill in the art will recognize other variations, modifications, and alternatives.

In one embodiment, a consumer group evaluates product acceptability 310 using various types of scales or scoring systems such as a hedonic scale. The consumer group ranges in size from about 25 to about 1000 members, more preferably, from about 25 to about 250 members. For wine, a consumer group can evaluate various attributes of the wine such as: i) taste acceptability; ii) strength of taste and iii) finish, on for example, a hedonic scale. The evaluations of the various attributes are then averaged 320. The averaged acceptability data is averaged over the consumer group. The Newman-Keuls value flags significant differences between samples to be identified. The Newman-Keuls system is based on the studentized range distribution. After the acceptability data are averaged, internal preferences mapping 330 using multivariate analysis such as principal component analysis (PCA), is performed. The number of principal components (PC) equals the number of preference dimensions. If there are two principal components in the product acceptance data, there are two preference dimensions.

Principal component analysis (PCA) involves a mathematical technique that transforms a number of correlated variables into a smaller number of uncorrelated variables. The smaller number of uncorrelated variables is known as principal components. The first principal component or eigenvector accounts for as much of the variability in the data as possible, and each succeeding component accounts for as much of the remaining variability as possible. The main objective of PCA is to reduce the dimensionality of the data set and to identify new underlying variables.

In practice, PCA compares the structure of two or more covariance matrices in a hierarchical fashion. For instance, one matrix might be identical to another except that each element of the matrix is multiplied by a single constant. The matrices are thus proportional to one another. More particularly, the matrices share identical eigenvectors (or principal components), but their eigenvalues differ by a proportional constant. Another relationship between matrices is that they share principal components in common, but their eigenvalues differ. The mathematical technique used in PCA is called eigen analysis. The eigenvector associated with the largest eigenvalue has the same direction as the first principal component. The eigenvector associated with the second largest eigenvalue determines the direction of the second principal component. The sum of the eigenvalues equals the trace of the square matrix and the maximum number of eigenvectors equals the number of rows of this matrix. (see, *Advances in Multivariate Statistical Analysis*, p. 31-43, in A. K. Gupta (ed), Reidel, Boston; and Flury, B. (1988) *Common Principal Components and Related Multivariate Models*, Wiley, New York). Commercially available statistical packages and software programs are available for performing principal component analysis (SAS Institute Inc., Cary, N.C., USA or www.sas.com).

In one embodiment, after the principal components (PC) are calculated, the consumer's acceptability data is correlated 340 therewith using an internal preference map. The internal preference map represents the correlation of consumer acceptability ratings with each the PC 340. Thereafter, by correlating the profile of descriptors (POD) and the human descriptive traits (HDTs) with each principal component, extended internal preference maps are generated 370.

Figure 4:
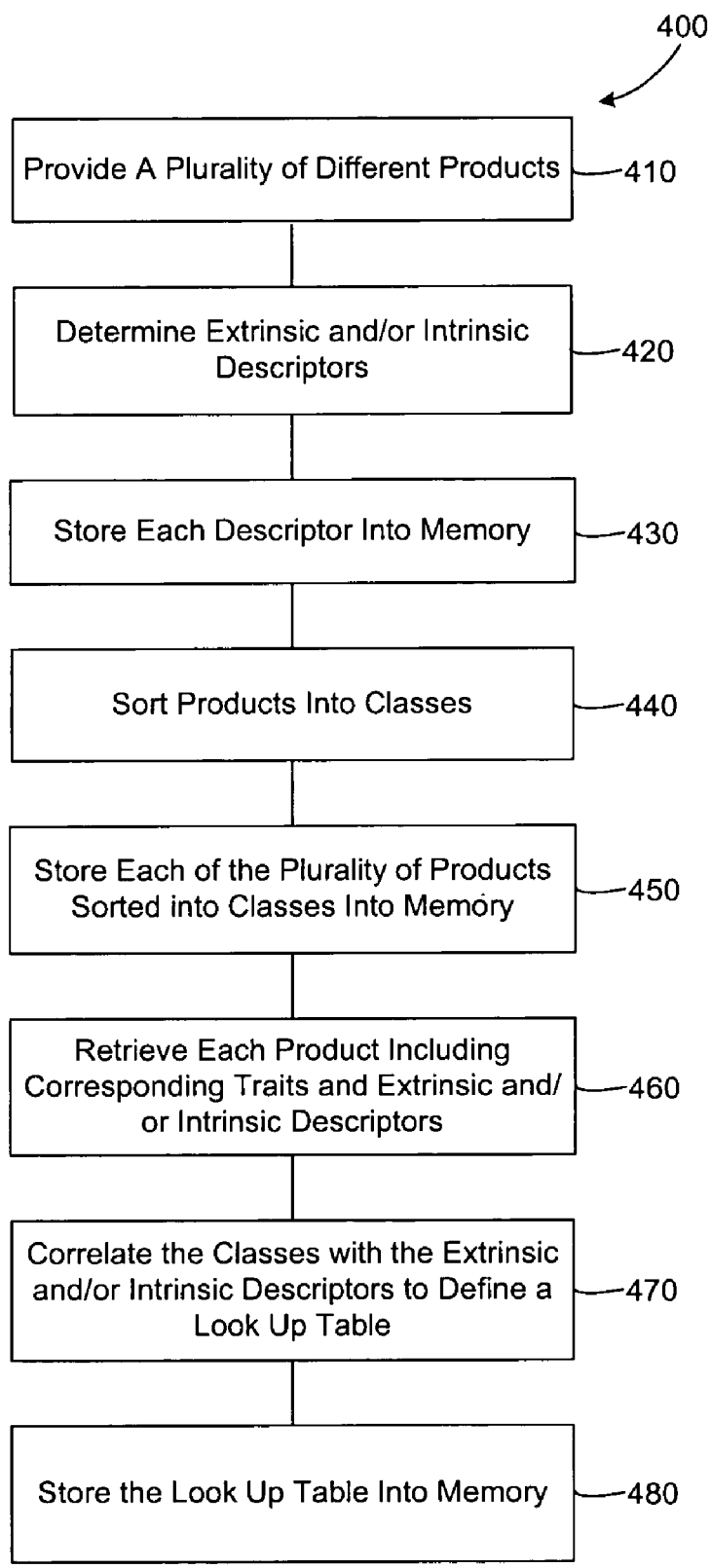
FIG. 4 illustrates a representative flowchart of simplified process steps in an embodiment according to the present invention.

FIG. 4 illustrates a flow chart 400 for an embodiment of a system of present invention. The diagram is merely an illustration and should not limit the scope of the claims herein. In step 410, for example, a plurality of different wine products is provided. Next, a plurality of extrinsic and/or intrinsic descriptors from each of the wine products is determined 420 thereby generating a profile of descriptors (POD). Thereafter, each of the wine descriptors and the corresponding wine information is stored into memory 430. In step 440, each of the plurality of wine products is sorted, wherein the sorting defines at least two classes. The sorting can be done by human sensory panels or by a POD. Wines are separated into these classes based upon whether they taste similar, or by weighting factors. In step 450, each of the plurality of wine products is stored in memory based upon their class or group. Next, in step 460, each of the wine products is retrieved and its corresponding POD. In step 470, the wine classes are correlated with the POD to define a look up table for the wine products. Finally, in step 480, the look up table is stored into memory.

The above sequence of steps is merely an example of a way to correlate objective intrinsic and/or extrinsic information corresponding to a wine product with human weighting factors that also correspond to the wine product. Such correlation can, for example, provide a degree of human preference of an unknown wine product, where extrinsic and/or intrinsic information can be readily measured. Further details of these steps are provided throughout the present specification and more particularly below.

Figure 5:
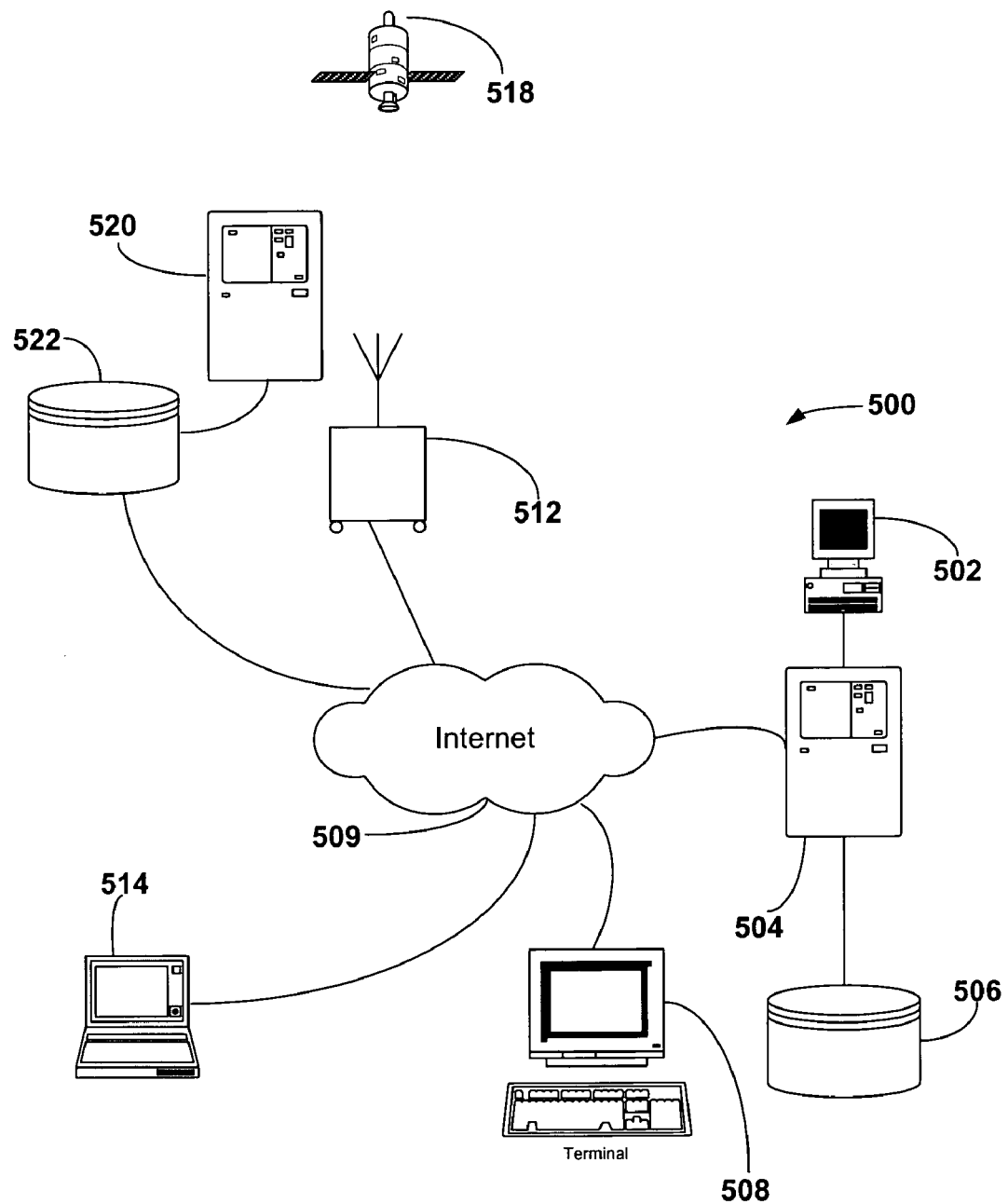
FIG. 5 illustrates a representative network environment for embodying the present invention.

In a preferred aspect, the systems of the present invention can operate in a networked environment. FIG. 5 represents one environment 500 in which the systems of present invention can be used. This diagram is merely an illustration and should not limit the scope of the claims herein. One of ordinary skill in the art will recognize other variations, modifications, and alternatives. Environment 500 includes a wide area network 509 such as, for example, the Internet. A plurality of consumer clients 508, 514 is connected to network 509. Also connected to the wide area network 509 is an information server 504, with terminal 502 and database 506 and one or more product manufactures servers 520, with database 522. The wide area network allows for communication of other computers such as a mobile unit 512, and a satellite unit 118. Wide area network 509 allows each of computers 502, 504, 508, 512, 514, 518 and 520 to communicate with other computers and each other.

Each of consumer computers 508, 514, 512 can be owned and operated by a different consumer. Consumer computers can be configured with many different hardware components and can be made in many dimensions, styles and locations (e.g., laptop, palmtop, pentop, server, workstation and mainframe). For example, computer 508 can be at the home of a first consumer, consumer computer 514 can be at the home of a second consumer, and consumer computer 512 can owned by a third consumer riding in a car, train, bus, etc. Consumer computer e.g., 508 can include, as one example, conventional desktop personal computers or workstations having the ability to connect to network 509 and being capable of running customized software supporting the service provided by the present invention.

Terminal 502 is connected to server 504. This connection can be by a network such as Ethernet, asynchronous transfer mode, IEEE standard 1553 bus, modem connection, universal serial bus, etc. The communication link need not be a wire but can be infrared, radio wave transmission, etc. Server 504 is coupled to the Internet 509. The Internet is shown symbolically as a cloud or a collection of server routers 509. The connection to server 504 to the Internet is typically by a relatively high bandwidth transmission medium such as a T1 or T3 line.

In certain embodiments, Internet server 504 and database 506 store information and disseminate it to consumer computers e.g. 508 over wide area network 509. The system of the present invention can be used for sensory or product matchmaking in environment 500. Server 504 connected to wide area network 509 stores physical parameters about a plurality of consumer products on an electronic database 106. The concepts of "client" and "server," as used in this application and the industry, are very loosely defined and, in fact, are not fixed with respect to machines or software processes executing on the machines. Typically, a server is a machine e.g. 504, 520 or process that is providing information to another machine or process, i.e., the "client," e.g. 508 that requests the information. In this respect, a computer or process can be acting as a client at one point in time (because it is requesting information) and can be acting as a server at another point in time (because it is providing information). Some computers are consistently referred to as "servers" because they usually act as a repository for a large amount of information that is often requested. For example, a WEB site is often hosted by a server computer with a large storage capacity, high-speed processor and Internet link having the ability to handle many high-bandwidth communication lines.

In one embodiment of the present invention, manufactures of products are also connected to the wide area network. FIG. 5 illustrates manufacture's server 520 coupled to storage device 522. In this embodiment, the manufacture of consumer products can supply physical parameters to database 506 for storage.

Figure 6:
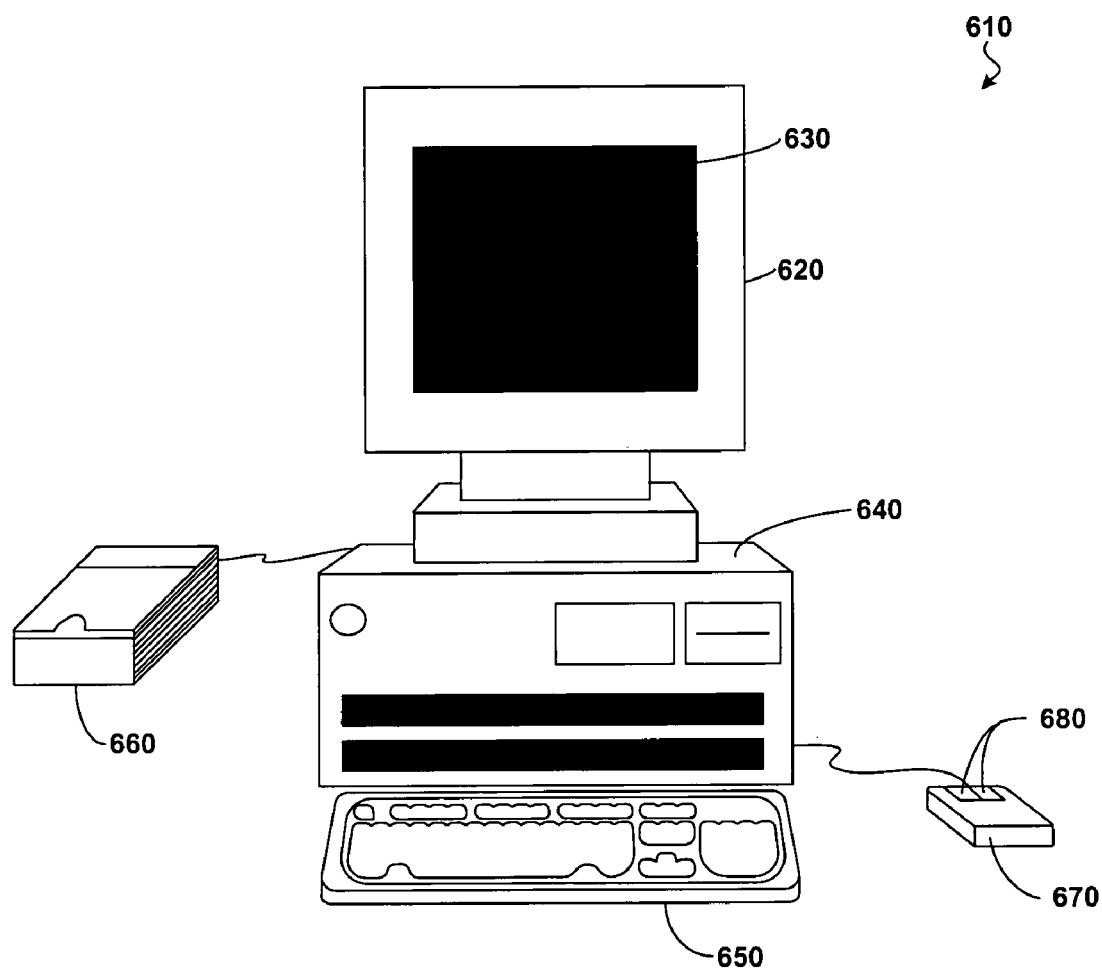
FIG. 6 is an illustration of a representative computer system in an embodiment according to the present invention.

FIG. 6 illustrates a representative system according to a particular embodiment of the present invention. This diagram is merely an illustration and should not limit the scope of the claims herein. One of ordinary skill in the art will recognize other variations, modifications, and alternatives. Embodiments according to the present invention can be implemented in a single application program such as a browser, or can be implemented as multiple programs in a distributed computing environment, such as a workstation, personal computer or a remote terminal in a client server relationship. FIG. 6 shows computer system 610 including display device 660, display screen 630, cabinet 640, keyboard 650, scanner 660 and mouse 670. Mouse 670 and keyboard 650 are representative "user input devices." Other examples of user input devices are a touch screen, light pen, track ball, data glove and so forth. FIG. 6 is representative of but one type of system for embodying the present invention. It will be readily apparent to one of ordinary skill in the art that many system types and configurations are suitable for use in conjunction with the present invention.

In a preferred embodiment, computer system 610 includes a Pentium® class based computer, running Windows® NT operating system by Microsoft Corporation. However, the apparatus is easily adapted to other operating systems and architectures by those of ordinary skill in the art without departing from the scope of the present invention.

Mouse 670 can have one or more buttons such as buttons 680. Cabinet 640 houses familiar computer components such as disk drives, a processor, storage device, etc. Storage devices include, but are not limited to, disk drives, magnetic tape, solid state memory, bubble memory, etc. Cabinet 640 can include additional hardware such as input/output (I/O) interface cards for connecting computer system 610 to external devices external storage, other computers or additional peripherals.

Figure 7:
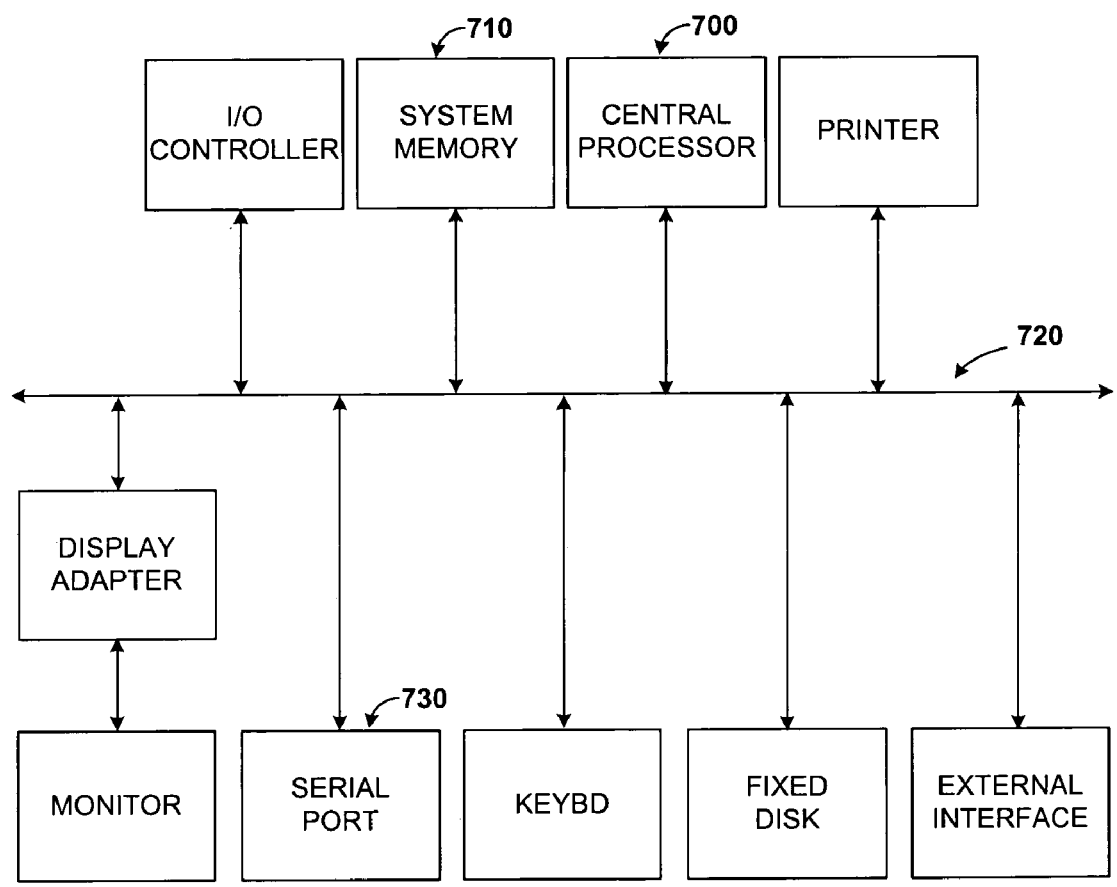
FIG. 7 is an illustration of basic subsystems of the system of FIG. 6.

FIG. 7 is an illustration of basic subsystems in computer system 610 of FIG. 6. This diagram is merely an illustration and should not limit the scope of the claims herein. One of ordinary skill in the art will recognize other variations, modifications, and alternatives. In certain embodiments, the subsystems are interconnected via a system bus 720. Additional subsystems such as a printer, keyboard, fixed disk and others are shown. Peripherals and input/output (I/O) devices can be connected to the computer system by any number of means known in the art, such as serial port 730. For example, serial port 730 can be used to connect the computer system to a modem, which in turn connects to a wide area network such as the Internet, a mouse input device, or a scanner. The interconnection via system bus 720 allows central processor 700 to communicate with each subsystem and to control the execution of instructions from system memory 710 or the fixed disk, as well as the exchange of information between subsystems. Other arrangements of subsystems and interconnections are readily achievable by those of ordinary skill in the art. System Memory 710, and the fixed-disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Figure 8:
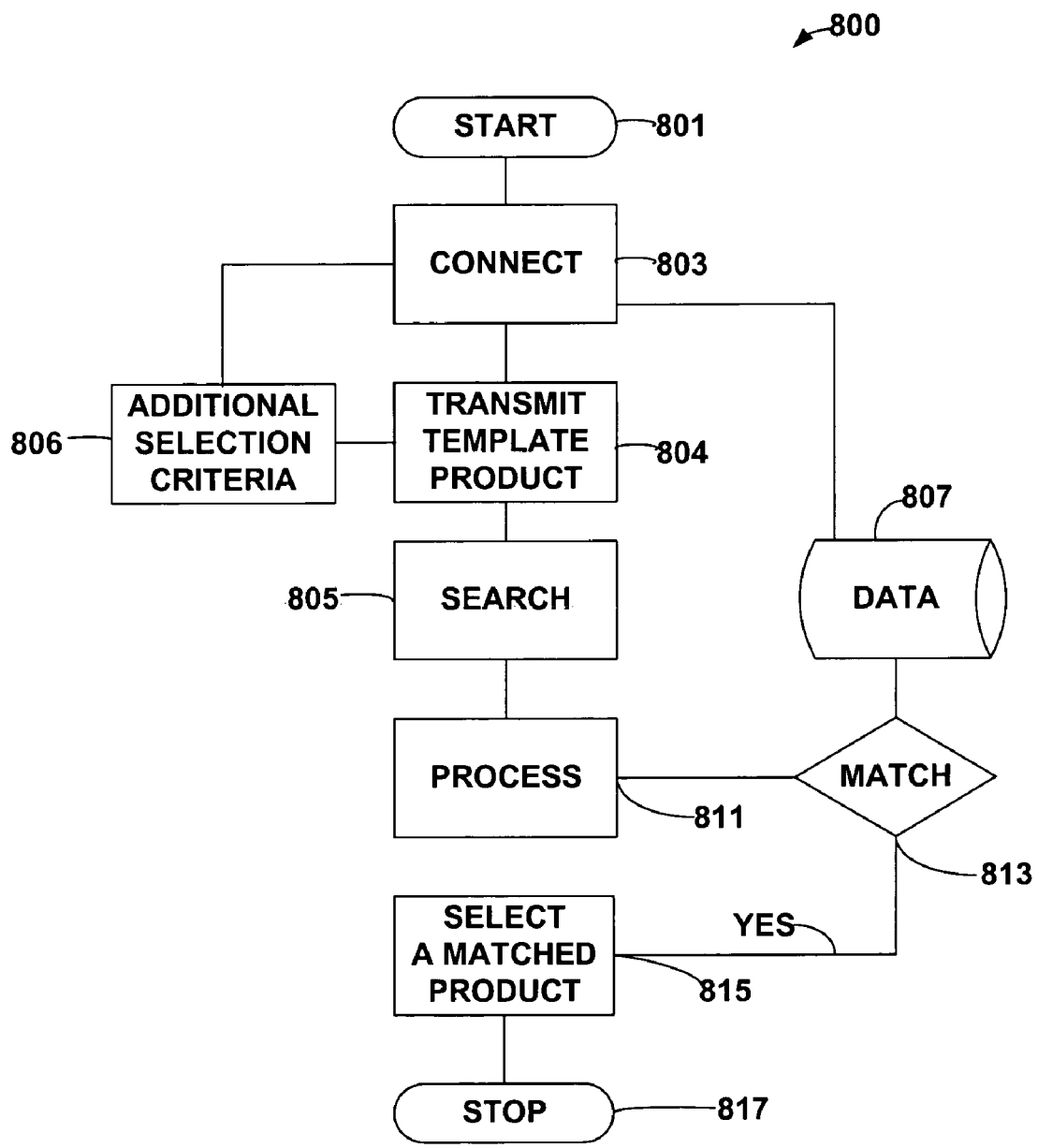
FIG. 8 illustrates a representative flowchart of simplified process steps in an embodiment according to the present invention.

FIG. 8 is one embodiment of a flow diagram 800 according to the present invention. This diagram is merely an illustration and should not limit the scope of the claims herein. One of ordinary skill in the art will recognize other variations, modifications, and alternatives. A client starts 801 by connecting 803 to a server over the wide area network by a connection protocol such as TCP/IP. The server is coupled to the database storing the PODs, HDTs and the various classes based on human similar tastes and smells of a plurality of products. The server is coupled to a plurality of other servers of manufactures of consumer products, such as consumer products. The user interface provides an HTML or XML interface, such as a WEB page, which can be accessed through the Netscape Navigator or the Microsoft Explorer browsers, although many documents can be viewed with any Mosaic-compatible web browser. The HTML interface is available to the client user as well as HTML on-line documentation. HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

Once the connection is established, the client transmits an information object such as a descriptor or a NAME BRAND, the information object being related to a first consumer product or template item 804. In certain embodiments, for example, this information object can include any descriptor in the POD or the NAME BRAND of the consumer product. For example, the user provides a name of a wine, such as "NAME BRAND" Cabernet Sauvignon 1996. This particular "NAME BRAND" Cabernet Sauvignon 1996 is then the "template" wine. In transmitting this information object of a first consumer product, the client user wishes to be educated about the availability of other consumer product such as wines, with similar attributes such as tastes and smells.

In certain embodiments, the client transmits an information object that reflects additional selection criteria 806. For instance, the extrinsic descriptor of cost, age appellation, etc. can be transmitted with the template product. Thus, by adding additional criteria, the user can more particularly tailor the matched list product 815. By transmitting the information object of the first consumer product, and any additional selection criteria, the search process 811 begins.

Based on this input from the client user, the system queries a database 807 or a plurality of servers comprising descriptors of specific consumer product products. For example, the database 807 contains an array of descriptors of a plurality of consumer product products such as wines. In a preferred embodiment, the descriptor is an artificial olfaction print or electronic nose signature of the consumer product. Based on the known electronic nose signature (ENS) of for example, NAME BRAND Cabernet Sauvignon 1996, the system searches the entire database for other ENS with the descriptor features. The query process generally performs a search to find like descriptors for other like products. The proximity engine of the present invention thereafter provides a list of other similar tasting wines that are the "matched" wines. In this system, the POD for a large portion of the wines produced in for example, California, France, Italy, Spain, etc., and a large portion of the wines produced in the rest of the world are loaded into a database. Preferably, pattern-matching algorithms and a web-based interface access the database and use the algorithms to provide the customer with a matched list.

In operation, a client connected to the wide area network, such as the Internet, can retrieve information about a particular consumer product, or a different yet related consumer product based upon various inputs from the client. The system processes the inputted NAME BRAND or descriptor(s) to find other similar products based upon the similarities of the product's correlation or the look-up table discussed in FIG. 4. The system then formulates a recommendation based upon various suitable algorithms. Through the use of these pattern-matching algorithms—via the web interface, the template wine's POD is compared to the rest of the database. A list of wines that match the template wine (the "matched" wines) are thereafter recommended to the user. Using the systems of the present invention, a user acquires expert tasting and matching abilities by using the preference engine of the present systems.

Embodiments of the present invention further include a relational database 506. As such, all files, all records and all data fields are interrelated with one another. In fact, all files, records and data fields such as the physical parameters, are instantaneously accessible, identifiable and expandable. One can request the system to make recommendations in a multitude of data fields throughout the database, and the system will automatically link all the files and make the appropriate recommendations.

In another embodiment, in addition to an ENS, the system queries the database based on an array of values from the HDT and/or POD to find a match 813. The match can be based on a variety of factors with various tolerance limits. With an ENS, neural net algorithms are useful. Once a match is found, a second product having similar attributes as the first product is displayed on the client users interface 815, and the system then stops at 817.

Figure 9:
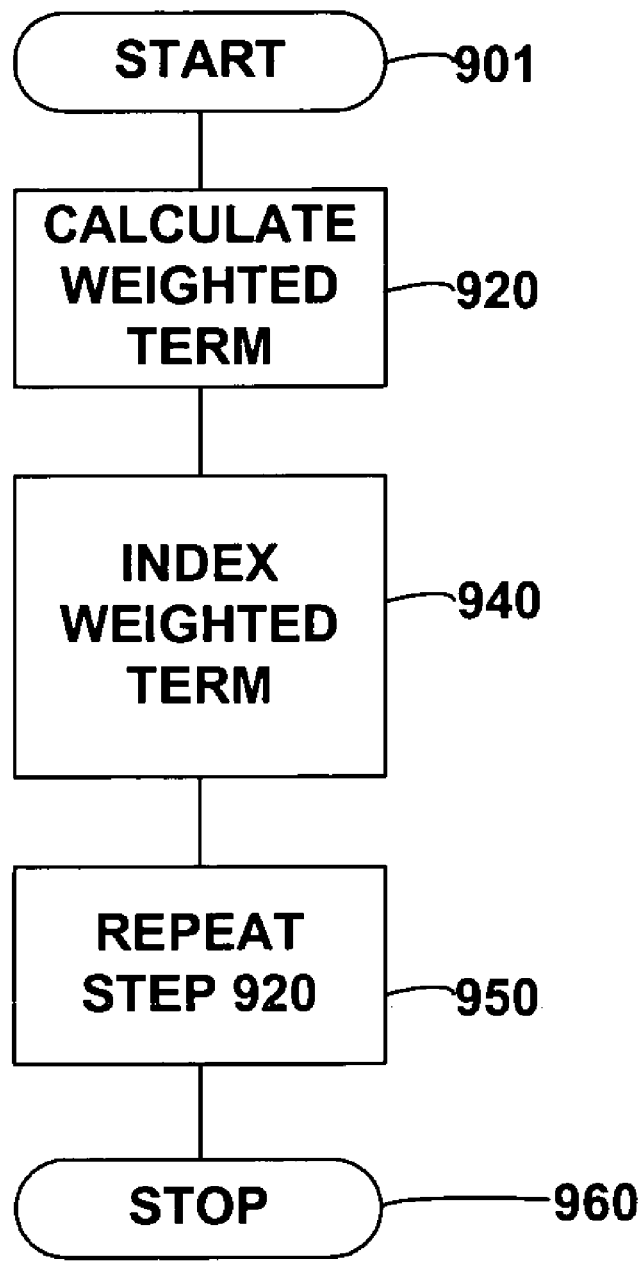
FIG. 9 illustrates a representative flowchart of simplified process steps in an embodiment according to the present invention.

In a preferred embodiment, as part of the matching process in step 813 in FIG. 8, each descriptor of the POD is assigned a weight based upon how well the descriptors correlate with the groups or classes separated based on similarity. FIG. 9 illustrates a flowchart of the steps that are performed to assign such weights. This diagram is merely an illustration and should not limit the scope of the claims herein. One of ordinary skill in the art will recognize other variations, modifications, and alternatives. The steps of FIG. 9 are performed for each descriptor that is associated with that consumer product. A weighted term is calculated for each descriptor of the POD of the consumer product (step 920 in FIG. 9). The weighted term indicates how much significance is given to that descriptor's ability to correlate to a particular class or group within the collection of consumer product products indexed and stored. More particularly, the weighted term specifies how readily the descriptor in the POD differentiates or classifies one product from another, or how similar two products are in taste and smell. The weighted terms ("WT") are then indexed for each consumer product (step 940 in FIG. 9). In step 950, each descriptor of the POD is assigned a particular weight. In step 950, each descriptor is given a weight until all of the descriptors from the POD are exhausted. The process stops at step 960.

Figure 10:
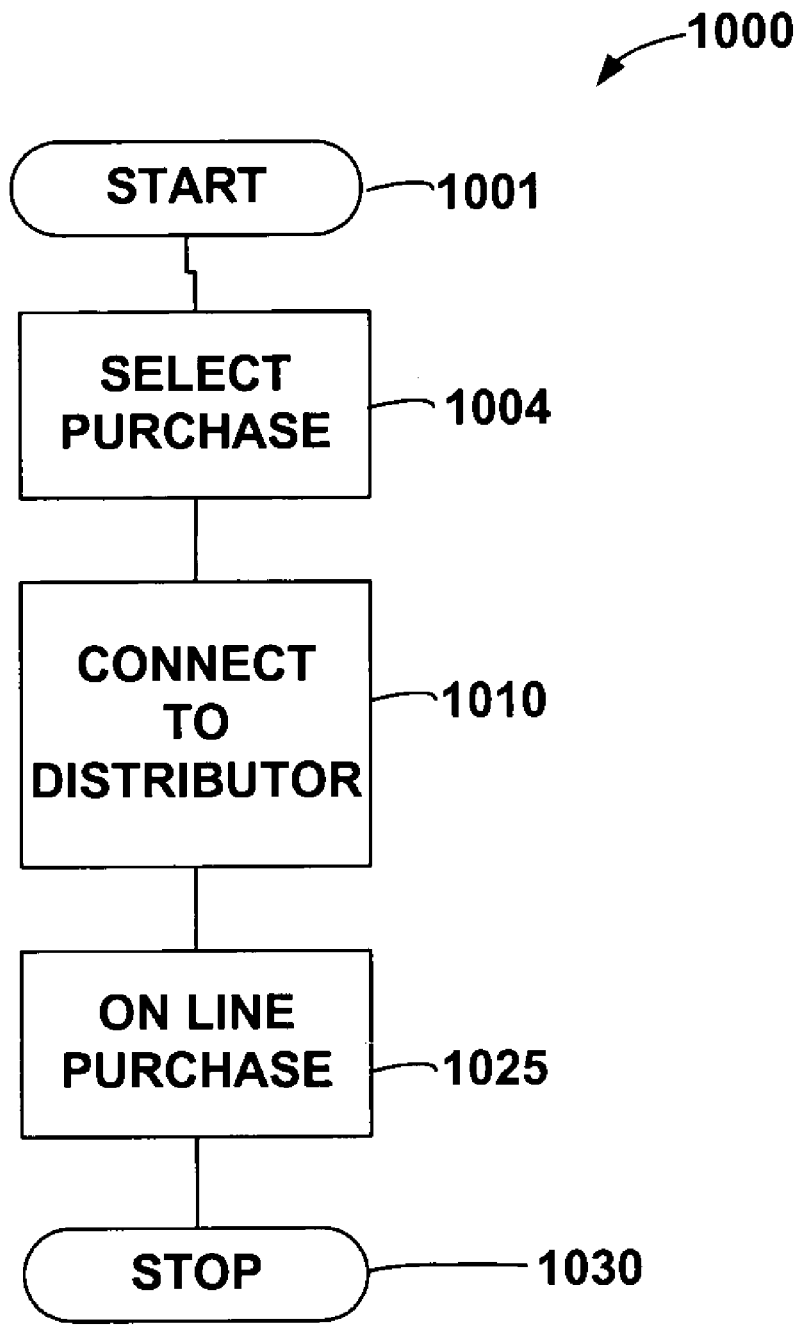
FIG. 10 illustrates a representative flowchart of simplified process steps in an embodiment according to the present invention.

In another embodiment, FIG. 10 illustrates a flow diagram 1000 of the selection of a second product 815 in FIG. 8. This diagram is merely an illustration and should not limit the scope of the claims herein. One of ordinary skill in the art will recognize other variations, modifications, and alternatives. The client user starts at step 1001 by requesting the purchase 1004 of the second product that is similar in HDT, POD, or similar in taste and or smell to the first product. As the server is connected to a plurality of manufactures or distributors of the selected second product, the client user selects the purchase of the product and is automatically connected 1010. In certain embodiments, before the purchaser connects to a product distributor, the purchaser receives information objects that comprise advertising objects. These advertising objects can include for example, discounts, coupons, particular vendors, etc.

For example, if the consumer product is wine, the purchaser links with a distributor including, but not limited to, www.klwines.com, www.wines.com, www.libation.com, www.shopfinewine.com, www.deananddeluca.com and www.wineshopper.com. For cosmetics and perfumes, the links include, but are not limited to, www.beautyjungle.com, www.beautiy.com, www.sephora.com, www.gloss.com and www.ibeauty.com.

Moreover, the purchaser can link to other sites for example, to recommend suitable entrees or pairing dinner selections. In this aspect, the purchaser links with for example, www.webvan.com and www.peapod.com. The client user fills in product quantity, delivery point and payment information. The payment can be by credit card or electronic banking features. The system is optionally linked with banking institutions, such as VISA®, MASTERCARD® or AMERICAN EXPRESS® so that credit card orders can be taken from the client users and be charged on-line. The user can also use an on-line wallet for purchases. The digital wallet allows faster purchasing such as one-click shopping. Digital wallets are available from MBNA®, First USA® and NextCard®. Other wallets include Gator®, Microsoft Passport® and IBM Consumer Wallet®. The system stops at 630.

Figure 11:
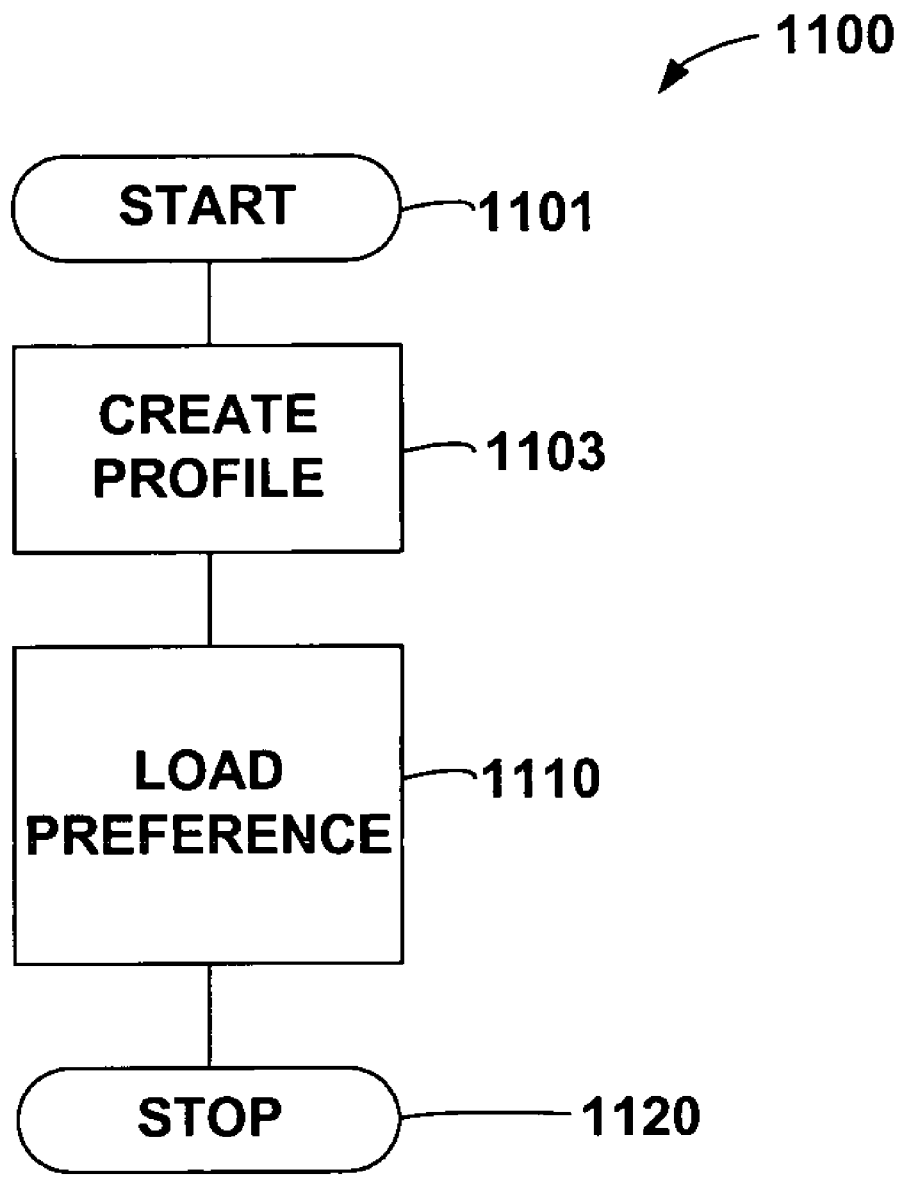
FIG. 11 illustrates a representative flow diagram of a personal profile.

FIG. 11 illustrates a flow diagram 1100 having a start step 1101, and thereafter a step 1103 for creating a profile for users at the client. This diagram is merely an example that should not limit the scope of the claims herein. One of ordinary skill in the art will recognize many other variations, alternatives, and modifications. In certain embodiments, the recommendation engine of the present invention comprises a preference engine. In one embodiment, the recommendation engine further comprises a preference engine. The preference engine collects preference data from user. Surveys are used to ascertain their preferences concerning the consumer product they are querying as well as other related products. This information is used to provide recommendations for other products that cannot be directly linked through analytical data to the template item. The user provides additional data about their preferences concerning the queried wine and other wines, or consumer products they have tried or know. The database of preferences is updated, and, thereafter, is capable of recommendation g other products based on similar profiles of other users. The user profile is generated and updated with regular use. The preference engine can provide an indication of which consumer products are of interest. In step 1110 the system loads personal preferences. Some embodiments can also provide a personal portal to a user at the client. The personal portal can provide consumer product information selected based upon the profile to the user. Preferably, the profile is initiated by visiting the server and updated by repeat visits. The system stops at step 1120.

Although the foregoing illustrative embodiment of the consumer product was primarily wine, those of skill in the art will recognize that many consumer products are suitable for use in the present invention. Suitable consumer products include, but are not limited to, tobacco, cosmetics, liquor, cognac, whiskey, bourbon, scotch, brandy, liqueurs, vodka, gin, rum, sherry, port, coffee, tea, cocoa, and mint. Those of skill in the art will know of other consumer products suitable for use in the present invention. Moreover, the present invention provides systems and methods for recommending natural consumer products formulated with adulterated substances including, but not limited to, oils, or mixtures of synthetic chemicals blended to match the natural flavor of fruit, e.g. strawberry, raspberry and black currant; artificial and natural flavors of brews and liquors, e.g. fruit juices including expelled juice from washed, scrubbed fruits such as lemon, orange, and lime; licorice, menthol, eucalyptus, aniseeds nuts (e.g. peanuts, coconuts, hazelnuts, chestnuts, walnuts, colanuts), almonds, and raisins.

Physical parameters for tobacco include, but are not limited to, nicotine (3-(1-methyl-2-pyrrolidinyl)-pyridine) including synthetic nicotine and nicotine extracts from tobacco plants, such as the genus *Nicotiana*; and other alkaloids with the same direction of activity including nor-nicotine and lobeline. Tobacco formulated with mixtures of sugars including glucose syrup, e.g. starch hydrolysates, containing a mixture of dextrose, maltose and a range of complex sugars, invert sugar syrup, e.g. sucrose inverted by invertase (also called sucrase or saccharase) containing a mixture of dextrose and fructose, high sugar content syrups such as treacle and honey containing a mixture of particular levulose, dextrose, maltose, sucrose, dextrin and higher sugars, and malt extracts.

While the invention has been described with reference to certain illustrated embodiments this description is not intended to be construed in a limiting sense. For example, the computer platform used to implement the above embodiments include 586 class-based computers, Power PC based-computers, Digital ALPHA based computers, SunMicrosystems SPARC computers, etc.; computer operating systems may include WINDOWS NT, DOS, MacOs, UNIX, VMS, etc.; programming languages may include C, $C^{++}$, Pascal, an object-oriented language, etc. Various modifications of the illustrated embodiments as well as other embodiments of the invention will become apparent to those persons skilled in the art upon reference to this description. In addition, a number of the above processes can be separated or combined into hardware, software, or both and the various embodiments described should not be limiting. It will be understood, therefore that the invention is defined not by the above description, but by the appended claims.

What is claimed is:

1. A system executed by a computer that recommends a consumer product selection across a network to a consumer, said system comprising:
    a recommendation engine comprising a first computing module, embodied in the computer, that determines a difference between a plurality of consumer products having a plurality of descriptors by differentiating between at least one descriptor of each said plurality of consumer products and providing said difference to a second computing module embodied in the computer;
    a descriptor module, embodied in the computer, that is configured to receive human descriptor trait (HDT) descriptor input regarding the plurality of descriptors of at least a sampled consumer product from at least two independent consumers at two independent nodes, respectively, on the network;
    the second computing module, coupled to said recommendation engine, that sorts between each of said consumer products to form at least two classes for said plurality of consumer products;
    a third computing module, embodied in the computer, and coupled to said recommendation engine, that determines for each of said plurality of consumer products a correlation between said at least two classes and each of said plurality of descriptors including the received HDT descriptor input, said third computing module assigning a weighting term for each of said plurality of descriptors based upon each of said descriptor's ability to sort between said at least two classes; and a fourth computing module, embodied in the computer, and coupled to said recommendation engine, that cooperatively operates on said weighting terms to provide a recommendation.

2. The system according to claim 1, wherein said consumer product is a member selected from the group consisting of cosmetics, tobacco, perfume, cologne, liquor, liqueurs and consumable liquids.

3. The system according to claim 2, wherein said consumer product is perfume.

4. The system according to claim 1, wherein each of said plurality of descriptors is a member independently selected from the group consisting of intrinsic descriptors and extrinsic descriptors.

5. The system according to claim 1, wherein each of said plurality of descriptors are in a digital format.

6. The system according to claim 5, wherein said digital format is derived from a member selected from the group consisting of a stream of data and static data.

7. The system according to claim 1, wherein said correlation between the plurality of consumer products and said at least two classes is generated using cluster mapping.

8. The system according to claim 1, wherein said network is the Internet.

9. The system according to claim 1, wherein the descriptor module is configured to further receive descriptor input including descriptors from an electronic nose signature of a consumer product.

* * * * *